United States Patent
Shimizu

(10) Patent No.: US 6,627,120 B2
(45) Date of Patent: Sep. 30, 2003

(54) CONDUCTIVE PASTE AND LAMINATED CERAMIC ELECTRONIC COMPONENT

(75) Inventor: Motohiro Shimizu, Kusatsu (JP)

(73) Assignee: Murata Manufacturing Co. Ltd. (JP)

( * ) Notice: Subject to any disclaimer, the term of this patent is extended or adjusted under 35 U.S.C. 154(b) by 0 days.

(21) Appl. No.: 10/354,106

(22) Filed: Jan. 30, 2003

(65) Prior Publication Data

US 2003/0160219 A1 Aug. 28, 2003

(30) Foreign Application Priority Data

Feb. 27, 2002 (JP) ........................... 2002-051074

(51) Int. Cl.⁷ .................. H01B 1/22; H01G 4/06; H01G 4/30; C04B 35/468
(52) U.S. Cl. ............... 252/521.2; 252/513; 252/518.1; 252/519.2; 252/519.3; 252/520.2; 252/62.3 R; 252/62.3 BT; 501/137; 423/69; 423/76; 423/138; 428/425.9; 428/433; 361/321.4; 361/311; 361/312; 361/313; 264/131
(58) Field of Search ................. 252/500, 573, 252/578.1, 579.2, 579.3, 579.32, 520.2, 521.2, 62.3 R, 62.3 BT; 501/137; 361/311, 312, 313, 321.4; 423/69, 76, 138; 428/425.9, 433; 264/131

(56) References Cited

U.S. PATENT DOCUMENTS

2002/0098969 A1 * 7/2002 Nakamura et al. .......... 501/137

FOREIGN PATENT DOCUMENTS

| JP | 01-304717 | 12/1989 | | |
|----|-----------|---------|---|---|
| JP | 05-054716 | 3/1993 | | |
| JP | 11-0666957 | 3/1999 | | |
| JP | 2002-025847 | * | 1/2002 | ............ H01G/4/12 |
| JP | 2002-025848 | * | 1/2002 | ............ H01G/4/12 |

* cited by examiner

Primary Examiner—Yogendra N. Gupta
Assistant Examiner—Kallambella Vijayakumar
(74) Attorney, Agent, or Firm—Dickstein, Shapiro, Morin & Oshinsky, LLP.

(57) ABSTRACT

In order to achieve miniaturization and an increase in the capacitance of a monolithic ceramic capacitor, a conductive paste suitable for forming an internal conductor film is provided, the layer thickness of the internal conductor film being decreased with a decrease in the layer thickness of a dielectric ceramic layer. The conductive paste contains a conductive powder, such as a nickel powder, an organic vehicle, an organic acid barium salt and an organic zirconium compound. Each of the organic acid barium salt in terms of barium atom and the organic zirconium compound in terms of zirconium atom is about 0.05 to 1.00 mol per mol of the conductive powder, and the content of the organic zirconium compound in terms of zirconium atom is about 0.98 to 1.02 mol per mol of the organic acid barium salt in terms of barium atom.

15 Claims, 1 Drawing Sheet

CONDUCTIVE PASTE AND LAMINATED CERAMIC ELECTRONIC COMPONENT

BACKGROUND OF THE INVENTION

1. Field of the Invention

The present invention relates to a conductive paste and a laminated ceramic electronic component made using this conductive paste to form internal conductor films. In particular, the present invention relates to an improvement advantageous for a decrease in the layer thickness and an increase in the number of layers of a laminated ceramic electronic component.

2. Description of the Related Art

Component bodies provided in laminated ceramic electronic components, for example, monolithic ceramic capacitors, have a laminated structure composed of a plurality of laminated ceramic layers with internal conductor layers extending along interfaces between the ceramic layers. In general, such a component body is manufactured by the steps of forming a film made of a conductive paste which is to become the internal conductor film on a ceramic green sheet which is to become a ceramic layer by printing, etc., laminating a plurality of ceramic green sheets including the ceramic green sheets provided with such a conductive paste film, and firing the resulting green laminate at a high temperature.

A paste used as the aforementioned conductive paste is prepared by dispersing a conductive powder in an organic vehicle composed of an organic binder and a solvent. The conductive paste for the internal conductor film conventionally contains a conductor using a powder made of a noble metal such as, for example, palladium and platinum. However, an inexpensive powder made of a base metal, for example, nickel, has come to be used as the conductive powder contained in the conductive paste in order to reduce the product's cost.

On the other hand, requirements for miniaturization and an increase in the number of layers of laminated ceramic electronic components have become intensified in the market. In particular, the requirements for miniaturization and an increase in the capacitance of monolithic ceramic capacitors have become intensified. Consequently, a decrease in the layer thickness of the ceramic layers has accelerated, and accompanying this decrease in the layer thickness of the ceramic layer, a decrease in the layer thickness of the internal conductor films has also accelerated. In order to decrease the layer thickness of the internal conductor film, it is effective to decrease the particle diameter of the conductive powder contained in a conductive paste.

When a nickel powder, for example, is used as the conductive powder, the nickel itself is likely to oxidize at a high temperature. Consequently, the firing step is performed in a nonoxidative atmosphere, for example, an inert atmosphere and a reducing atmosphere. Since the oxidization velocity of nickel significantly depends on the specific surface area of the nickel powder, the nickel becomes likely to be oxidized with a decrease in the particle diameter of the nickel powder, and concomitant surface area increase, even when the firing is performed in the nonoxidative atmosphere. Therefore, structural defects due to oxidization of nickel are still likely to occur.

Furthermore, accompanying the decrease in the particle diameter of the nickel powder, sintering and shrinkage of the nickel powder start at a relatively early stage of the firing during the firing step. Consequently, the difference of the shrinkage starting temperature and the quantity of shrinkage between the ceramic layer and the conductive paste film are increased when a green laminate is integrally fired. As a result, a relatively large stress is generated inside the laminate, and thereby, structural defects, for example, delamination and cracking, become likely to occur.

In order to overcome the aforementioned problems, a ceramic material powder having the same or nearly the same composition as that of a ceramic material powder contained in the ceramic layer can be added to the conductive paste for the sake of suppressing or controlling the sintering shrinkage of the conductive paste. It is believed that the aforementioned ceramic material powder added to the conductive paste stays between nickel particles in the conductive paste, acting as a pinning material during the sintering of the green laminate, and thereby, performs a function of suppressing the sintering shrinkage of the conductive paste film which is to become an internal conductor film.

However, when a fine-particle nickel powder having an average particle diameter of about 0.2 µm or less, for example, is used in the conductive paste in order to further decrease the layer thickness of the internal conductor film in the laminated ceramic electronic component, it becomes difficult to achieve an adequate effect of suppressing the sintering by only performing addition of the aforementioned ceramic material powder since the specific surface area of the nickel powder itself is further increased, and the frequency of contact of the nickel particles with each other is further increased, in the conductive paste with a decrease in the particle diameter.

Furthermore, spheroidizing due to sintering of a nickel powder becomes more likely to occur with a decrease in the particle diameter of the nickel powder. This spheroidizing of nickel interferes the continuity of the internal conductor film, and causes a reduction of the coverage of an internal electrode. The spheroidizing of nickel can be prevented to some degree by the addition of the aforementioned ceramic material powder. However, when the particle diameter of the nickel powder is further decreased, it becomes difficult to completely prevent the spheroidizing of nickel. Consequently, the continuity of the internal conductor film is impaired with a decrease in the layer thickness of the internal conductor film, and its coverage is thereby reduced. As a result, the design capacitance of the monolithic ceramic capacitor may not be achieved.

Although the nickel powder was primarily described above, substantially similar problems may be encountered in the case of a powder of silver, silver-palladium alloy, copper, etc.

SUMMARY OF THE INVENTION

Accordingly, it is an object of the present invention to provide a conductive paste capable of overcoming the aforementioned problems and a laminated ceramic electronic component constituted using this conductive paste.

A conductive paste according to an aspect of the present invention contains a conductive powder and an organic vehicle, and further contains an organic acid barium salt and an organic zirconium compound in order to overcome the aforementioned technical problems. The content of each of the organic acid barium salt in terms of barium atom and the organic zirconium compound in terms of zirconium atom is about 0.05 to 1.00 mol relative to one mol of the conductive powder, and the content of the organic zirconium compound in terms of zirconium atom is 0.98 to 1.02 mol relative to one mol of the organic acid barium salt in terms of barium atom.

Preferably, a nickel powder is used as the aforementioned conductive powder.

The conductive paste according to the present invention is in particular applied with advantage when the average particle diameter of the conductive powder contained therein is about 0.2 μm or less.

The conductive paste according to the present invention is used with advantage for forming internal conductor films extending along interfaces between a plurality of laminated ceramic layers.

According to another aspect of the present invention, a laminated ceramic electronic component including a plurality of laminated ceramic layers and internal conductor films extending along interfaces between the ceramic layers is provided. In the laminated ceramic electronic component according to the present invention, the aforementioned internal conductor films are products of firing of the conductive paste according to the present invention.

Preferably, the aforementioned ceramic layer is composed of barium titanate.

The laminated ceramic electronic component according to the present invention is applied to a monolithic ceramic capacitor with further advantage. In this case, the internal conductor films are arranged in order to achieve a predetermined capacitance via the ceramic layers and, in addition, the laminated ceramic electronic component is provided with external electrodes arranged on outer surfaces of a laminate composed of a plurality of the ceramic layers and electrically connected to predetermined internal conductor films for using the capacitance.

As described above, the conductive paste according to the present invention contains the conductive powder, the organic vehicle, as well as the organic acid barium salt and the organic zirconium compound, the content of each of the organic acid barium salt in terms of barium atom and the content of the organic zirconium compound in terms of zirconium atom is specified to be about 0.05 to one mol relative to one mol of the conductive powder, and the content of the organic zirconium compound in terms of zirconium atom is specified to be about 0.98 to 1.02 mol relative to 1.00 mol of the organic acid barium salt in terms of barium atom. Consequently, even when the average particle diameter of the conductive powder is reduced to, for example, about 0.2 μm or less, the sintering thereof can be achieved without adversely affecting the electrical characteristics of the laminated ceramic electronic component using the aforementioned conductive paste, for example, without changing the capacitance change rate with temperature of the monolithic ceramic capacitor.

Therefore, a decrease in the layer thickness and high coverage with the internal conductor film formed using this conductive paste can be simultaneously achieved, and structural defects of the laminated ceramic electronic component constituted using this conductive paste can become unlikely to occur.

Consequently, when the conductive paste according to the present invention is in particular used for forming the internal conductor film provided in the monolithic ceramic capacitor, miniaturization and an increase in the capacitance of the monolithic ceramic capacitor can be achieved with advantage while the high reliability is maintained.

DESCRIPTION OF THE PREFERRED EMBODIMENTS

Figure 1:
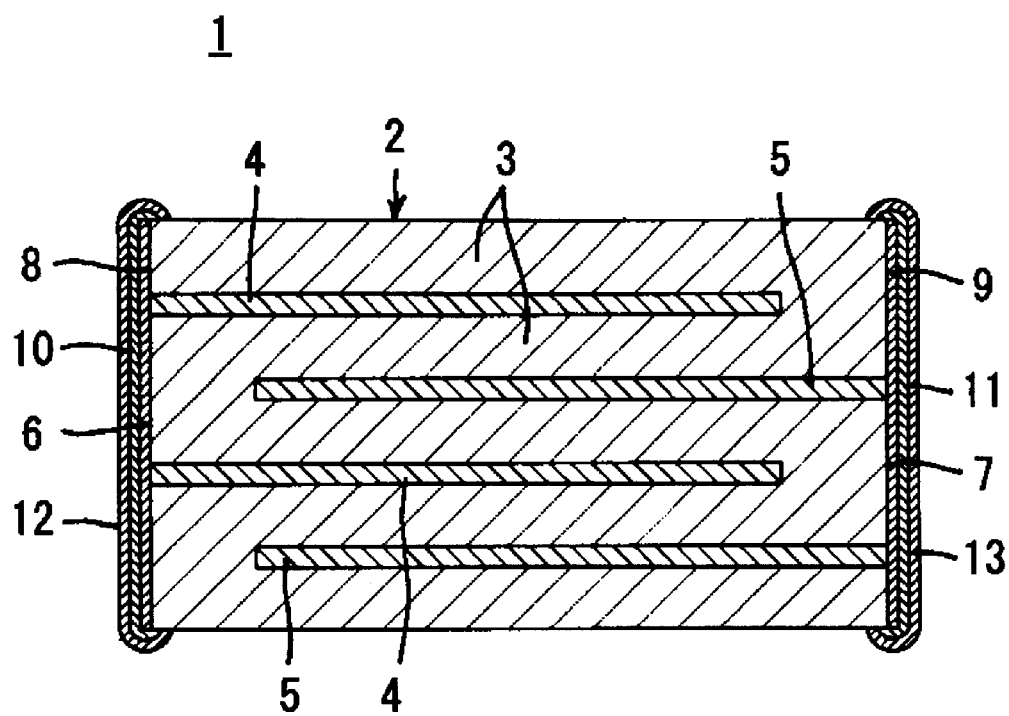
FIG. 1 is a sectional view of a monolithic ceramic capacitor according to an embodiment of the present invention.

FIG. 1 is a sectional view illustrating a monolithic ceramic capacitor 1 as an example of a laminated ceramic electronic component constituted using the conductive paste according to the present invention.

The monolithic ceramic capacitor 1 is provided by a laminate 2. The laminate 2 is provided with a plurality of laminated dielectric ceramic layers 3 and a plurality of internal conductor films 4 and 5 individually arranged along a plurality of predetermined interfaces between a plurality of the dielectric ceramic layers 3.

The internal conductor films 4 and 5 are formed to reach the outer surfaces of the laminate 2. The internal conductor films 4 which extend to one end surface 6 of the laminate 2 and the internal conductor films 5 which extend to the other end surface 7 are alternately arranged the laminate 2 in order to achieve the capacitance via the dielectric ceramic layers 3.

In order to use the aforementioned capacitance, external electrodes 8 and 9 are arranged on end surfaces 6 and 7, respectively, of outer surfaces of the laminate 2 while being electrically connected to either the internal conductor films 4 or 5 in a predetermined way. If necessary, first plating layers 10 and 11 made of nickel, copper or the like, are formed on the external electrodes 8 and 9, respectively, and second plating layers 12 and 13 made of solder, tin or the like, are further formed thereon, respectively.

The aforementioned monolithic ceramic capacitor 1 is manufactured as described below, for example.

A slurry containing a material powder of, for example, a barium titanate-based, dielectric ceramic and appropriate additives is prepared. This slurry is shaped into a sheet, and therefore, a ceramic green sheet which is to become the dielectric ceramic layer 3 is prepared. A conductive paste film for the internal conductor film 4 or 5 having a desired pattern is formed on the ceramic green sheet by printing, etc., using the conductive paste.

The required number of ceramic green sheets provided with respective conductive paste films, as described above, are laminated, and ceramic green sheets provided with no conductive paste film are laminated on the top and bottom thereof. Subsequently, thermocompression bonding is performed, and therefore, an integrated laminate 2 in a green state is produced. In order to produce this green laminate 2, a step of cutting is performed after the aforementioned thermocompression bonding in many cases.

The green laminate 2 is fired, and thereby, a sintered laminate 2 is produced. As described later, when the conductive paste for the internal conductor films 4 and 5 contains a base metal powder, for example, a nickel powder, as the conductive powder, this firing step is performed in a nonoxidative atmosphere, such as an inert atmosphere and a reducing atmosphere. When the firing is performed in the nonoxidative atmosphere, a ceramic material powder having reduction resistance is contained in the ceramic green sheet. During the firing of the laminate 2, the aforementioned ceramic green sheets are sintered to become the dielectric ceramic layers 3, and the conductive paste films are sintered to become the internal conductor films 4 and 5.

The external electrodes 8 and 9 are formed on end surfaces 6 and 7, respectively, of the laminate 2 while being electrically connected to either of the internal conductor films 4 and 5 in a predetermined way. The external electrodes 8 and 9 are formed by applying and baking a conductive paste containing a metal powder as a conductive component and glass frit.

Thereafter, first plating layers 10 and 11 are formed on the external electrodes 8 and 9, respectively, by plating nickel, copper or the like, and second plating layers 12 and 13 are further formed thereon, respectively, by plating solder, tin or the like. Consequently, the monolithic ceramic capacitor 1 shown in FIG. 1 is completed.

In the aforementioned monolithic ceramic capacitor 1, the conductive paste used for forming the internal conductor films 4 and 5 contains a conductive powder and an organic vehicle, and further contains an organic acid barium salt and an organic zirconium compound. Each of the organic acid barium salt in terms of barium atom and the organic zirconium compound in terms of zirconium atom is about 0.05 to 1.00 mol relative to one mol of the conductive powder, and the content of the organic zirconium compound in terms of zirconium atom is about 0.98 to 1.02 mol relative to one mol of the organic acid barium salt in terms of barium atom.

Examples of organic acids usable for the aforementioned organic acid barium salt include, for example, oxalic acid, naphthenic acid, stearic acid and oleic acid.

Examples of organic zirconium compounds include, for example, tetrabutoxyzirconium, tetraethoxyzirconium, tetrapropoxyzirconium, tetramethoxyzirconium, zirconium octylate, and zirconium naphthenate.

The aforementioned composition adopted in the conductive paste was determined based on the findings attained through the experiments described bellow.

A zirconium organic compound was made into an organic metal compound solution, and the resulting solution was added to a conductive paste containing a nickel powder to produce homogeneous mixture. The inventors of the present invention considered that when the conductive paste containing this zirconium component was fired, zirconium oxide was generated during the firing step, and this zirconium oxide was allowed to function as a ultrafine-particulate pinning point, and therefore, an effect of suppressing sintering was exerted.

The sintering shrinkage behavior of a green compact shaped from a powder produced by pulverizing a dry film of this conductive paste was examined by TMA (thermomechanical analysis). As a result, it was made clear that the sintering shrinkage starting temperature of the conductive paste containing a zirconium component was shifted toward the high-temperature side compared with that of a conductive paste containing no zirconium component.

A monolithic ceramic capacitor was manufactured using a barium titanate ($BaTiO_3$)-based dielectric material as the material for the dielectric ceramic layer and using a conductive paste containing the aforementioned zirconium component as the material for the internal conductor film. During the sintering step of the laminate formation, zirconium diffused from the internal conductor film to the dielectric ceramic layer side as zirconium oxide, and a solid solution was generated at the titanium (B) site having a comparable ionic radius, and as a result, the B site of the dielectric became excessive. Consequently, a problem occurred in that the capacitance-temperature characteristic of the monolithic ceramic capacitor fell outside the range of the original design.

On the other hand, when a barium component, which was an A site component, was added to the conductive paste as an organic compound together with the zirconium component, the sintering of the conductive paste which was to become the internal conductor film, proceeded with no substantial change in the capacitance-temperature characteristic of the monolithic ceramic capacitor, and at the same time, high coverage with the internal conductor film was achieved.

Based on the foregoing, the addition of both the barium component and the zirconium component, that is, both the organic acid barium salt and the organic zirconium compound, to the conductive paste was preferable.

The contents of these organic acid barium salt and the organic zirconium compound were examined, and the following was determined.

When the mole ratio of barium/zirconium was more than about 1.02, or less than about 0.98 in the conductive paste, the capacitance-temperature characteristic of the monolithic ceramic capacitor was changed remarkably. Accordingly, it was made clear that the content of the organic zirconium compound in terms of zirconium atom had to be within the range of about 0.98 to 1.02 mol relative to one mol of the organic acid barium salt in terms of barium atom.

When both the mole ratio of barium/nickel and the mole ratio of zirconium/nickel were less than about 0.05, the effect of suppressing the sintering of nickel was not adequate, and when they were more than about 1.00, the capacitance-temperature characteristic was changed because diffusion and a solid solution of barium and zirconium in the dielectric ceramic layer became excessive. According to this, barium and zirconium had to be at the stoichiometric ratio or its vicinity, and each of the contents thereof had to be 0.05 to 1.00 mol relative to one mol of nickel.

Furthermore, the sintered laminate produced by the aforementioned experiment was subjected to electrolytic peeling, and the vicinity of the interface between the internal conductor film and the dielectric ceramic layer was analyzed using X-ray diffraction. As a result, it was verified that $BaZrO_3$ crystals were generated in a uniform condition.

When the barium component and the zirconium component are added as an organic compound solution to the conductive paste as described above, the barium component and the zirconium component can be further uniformly dispersed in the conductive paste compared with that in the case where solid oxides, such as a ceramic material powder, which are common to the ceramic contained in the dielectric ceramic layer are added. The barium component and the zirconium component uniformly dispersed as droplets in the conductive paste generate ultrafine-particulate $BaZrO_3$ crystals during the sintering step, and therefore, sintering of nickel can be suppressed due to pinning between the nickel particles.

In addition to the barium component and the zirconium component, the aforementioned solid oxides may be concurrently used as the additive to the conductive paste. It is believed that with the concurrent use of such solid oxides, sintering of the internal conductor film can be more efficiently suppressed without impairment of the originally designed electrical characteristics of the monolithic ceramic capacitor.

The above description was made regarding the experiments using the nickel powder as the conductive powder. However, similar results are attained with conductive powders made of other metals, for example, silver, silver-palladium alloy and copper.

Furthermore, the above description was made regarding a monolithic ceramic capacitor. However, the conductive paste according to the present invention can be used with advantage to form internal conductor films in laminated ceramic electronic components other than the monolithic ceramic capacitor, as long as the laminated ceramic electronic components are provided with a plurality of laminated ceramic layers laminated and internal conductor films extending along at least one interface between the ceramic layers.

Next, experiments performed in order to determine the scope of the present invention will be described.

EXAMPLES

A conductive paste for forming internal conductor films of a monolithic ceramic capacitor was manufactured as described below.

A basic composition was prepared to have a composition of 45.0% by weight of nickel powder having an average particle diameter of 0.2 μm, 5.0% by weight of barium titanate-based ceramic material powder having an average particle diameter of 0.1 μm, 35% by weight of organic vehicle prepared by dissolving 10% by weight of ethyl cellulose into 90% by weight of terpineol, and 15% by weight of terpineol. Barium oxalate as an organic barium salt and tetrabutoxyzirconium as an organic zirconium compound were added to this basic composition. The quantities of addition thereof are shown in Table 1. Subsequently, a dispersion mixing treatment was performed with a triple roller mill in order to achieve an excellent dispersion, and thereby, a conductive paste was manufactured.

In Table 1, "Mole ratio of barium" indicates the content, on a mole basis, of barium octylate in terms of barium atom relative to one mol of the nickel powder, and "Mole ratio of zirconium" indicates the content, on a mole basis, of tetrabutoxyzirconium in terms of zirconium atom relative to one mol of the nickel powder. "Ba:Zr" indicates the ratio, on a mole ratio basis, of the content of barium octylate in terms of barium atom to the content of tetrabutoxyzirconium in terms of zirconium atom.

Ceramic green sheets which were to become dielectric ceramic layers of the monolithic ceramic capacitor were manufactured as described below.

A poly(vinyl butyral)-based binder and an organic solvent, for example, ethanol, are added to a reduction-resistant dielectric ceramic material powder primarily containing barium titanate and having an average particle diameter of 0.2 μm, followed by wet-mixing with a ball mill, and thereby, a ceramic slurry was produced. This ceramic slurry was shaped by a doctor blade method into sheets having a thickness that realizes a dielectric ceramic layer thickness of 2 μm after sintering, and rectangular ceramic green sheets were thereby produced.

The aforementioned conductive paste was applied by screen printing on the ceramic green sheets, and therefore, conductive paste films were produced. At this time, the thickness of the conductive paste film was set in order that the nickel coating thickness measured using a fluorescent X-ray apparatus becomes 0.55 μm.

A plurality of ceramic green sheets including ceramic green sheets provided with the conductive paste film were laminated, and were integrated by hot pressing. Subsequently, cutting into a predetermined size was performed, and thereby, a green laminate was produced. In the resulting green laminate, conductive paste films extending to one end surface of the laminate and conductive paste films extending to the other end surface are alternately arranged in the direction of lamination.

The green laminate was heated to a temperature of 350° C. in an atmosphere of nitrogen, and the binder was thereby decomposed. Thereafter, firing was performed in a reducing atmosphere composed of a $H_2$—$N_2$—$H_2O$ gas at a partial pressure of oxygen of $10^{-9}$ to $10^{-12}$ MPa with a temperature profile of maintaining a maximum sintering temperature of 1200° C. for 2 hours, and thereby, a sintered laminate was produced.

Both end surfaces of the sintered laminate were coated with a conductive paste containing a $B_2O_3$—$Li_2O$—$SiO_2$—$BaO$-based glass frit and silver as a conductive component, followed by baking in an atmosphere of nitrogen at a temperature of 600° C., and thereby, external electrodes electrically connected to the internal conductor films were formed.

The monolithic ceramic capacitor thus produced had an external size of 1.2 mm in width, 2.0 mm in length and 1.0 mm in thickness, and the thickness of the dielectric ceramic layer interposed between the internal conductor films was 2 μm. The number of effective dielectric ceramic layers was 100, and the effective facing area of the internal conductor film was 1.7 $mm^2$ on a layer basis.

Regarding the monolithic ceramic capacitor of each of the resulting samples, he coverage, capacitance and capacitance change rate with temperature was evaluated, and the results thereof are shown in Table 1.

For more details regarding the "coverage", the monolithic ceramic capacitor according to each of the resulting samples was peeled along the internal conductor film, a micrograph was taken of the condition of the internal conductor film perforated with holes, the micrograph was subjected to an image analysis treatment, and the degree of coverage with the internal conductor film was thereby quantified.

Regarding the "capacitance", 200 units of test samples were randomly taken out of the resulting monolithic ceramic capacitors which served as test samples, and measurements were performed under the condition of 1 kHz and 1 V rms at a temperature of 25° C.

Regarding the "capacitance change rate with temperature", the capacitance was measured at a temperature of 85° C. while a direct-current voltage of 6.3 V was applied, and the change rate thereof was determined with reference to the capacitance determined as described above.

TABLE 1

| Sample No. | Mole ratio of barium (relative to Ni) | Mole ratio of zirconium (relative to Ni) | Mole ratio of Ba:Zr | Coverage (%) | Capacitance (μF) | Capacitance change rate with temperature (%) | Evaluation |
| --- | --- | --- | --- | --- | --- | --- | --- |
| 1 | 0.05 | 0.05 | 1:1 | 68.2 | 1.44 | −9.5 | ◯ |
| 2 | 0.30 | 0.30 | 1:1 | 70.5 | 1.51 | −9.5 | ◯ |

TABLE 1-continued

| Sample No. | Mole ratio of barium (relative to Ni) | Mole ratio of zirconium (relative to Ni) | Mole ratio of Ba:Zr | Coverage (%) | Capacitance (μF) | Capacitance change rate with temperature (%) | Evaluation |
|---|---|---|---|---|---|---|---|
| 3 | 0.50 | 0.50 | 1:1 | 73.2 | 1.56 | −9.5 | ○ |
| 4 | 0.75 | 0.75 | 1:1 | 76.4 | 1.63 | −9.6 | ○ |
| 5 | 1.00 | 1.00 | 1:1 | 78.8 | 1.69 | −9.8 | ○ |
| 6 | 0.50 | 0.49 | 1:0.98 | 72.9 | 1.55 | −9.5 | ○ |
| 7 | 0.50 | 0.51 | 1:1.02 | 73.5 | 1.57 | −9.6 | ○ |
| 8 | 0.00 | 0.00 | — | 63.0 | 1.33 | −9.4 | x |
| 9 | 0.03 | 0.03 | 1:1 | 64.8 | 1.36 | −9.4 | x |
| 10 | 1.20 | 1.20 | 1:1 | 80.6 | 1.71 | −10.2 | x |
| 11 | 0.50 | 0.45 | 1:0.90 | 67.3 | 1.49 | −9.2 | Δ |
| 12 | 0.50 | 0.55 | 1:1.10 | 75.1 | 1.59 | −10.5 | x |

Comparisons are made between Samples 1 to 5 and Sample 8 as a comparative example with reference to Table 1. According to Samples 1 to 5 in which each of barium and zirconium is contained at a mole ratio within the range of about 0.05 to 1.00 relative to nickel in the conductive paste, the coverage and the capacitance are 5 increased with an increase in the quantity of addition compared with Sample 8 containing neither barium nor zirconium. Regarding the capacitance change rates with temperature, substantially no difference is recognized between Samples 1 to 5 and Sample 8.

Comparisons are made between Sample 3 and Samples 6 and 7. In Sample 3, barium and zirconium are contained in the conductive paste in order to become equal to each other in the number of moles (1:1), for example, 0.50 and 0.50, respectively, on a mole ratio basis, relative to nickel. In Samples 6 and 7, the mole ratios of zirconium to barium are differentiated in order that the mole ratios become 0.98 and 1.02, respectively. However, even when Ba:Zr is changed within the range of 1:0.98 to 1:1.02 as in Samples 6 and 7, regarding every evaluation item shown in Table 1, no remarkable difference is recognized when compared with that in Sample 3 indicating the case of the equal mole ratio.

On the other hand, barium and zirconium are contained in the conductive paste in Sample 9 as a comparative example in order that each of the contents thereof becomes 0.03 on a mole ratio basis relative to nickel. There is substantially no difference between each of the evaluation results of this Sample 9 and that of Sample 8 containing no barium or zirconium. Consequently, it is clear that each of the quantities of addition of barium and zirconium in Sample 9 is too small for exerting adequate effect.

In Sample 10 as a comparative example, barium and zirconium are contained in the conductive paste in order that each of the contents thereof becomes 1.20 on a mole ratio basis relative to nickel. According to this Sample 10, the capacitance change rate with temperature is increased. The reason for this is believed that each of the contents of barium and zirconium relative to nickel becomes excessive, and diffusion of these components into the dielectric ceramic layer becomes thereby excessive.

In Sample 11, the ratio of zirconium to barium is 0.90 on a mole ratio basis. Regarding this Sample 11, the coverage is decreased and the capacitance is also relatively decreased. The reason for this is believed that since barium is excessive relative to zirconium, the barium component diffused into the dielectric ceramic layer makes the A site of the titanate excessive in the ceramic composition ratio in the vicinity of the interface to the internal conductor film, and sintering in the dielectric ceramic layer is thereby suppressed.

In Sample 12, the ratio of zirconium to barium is 1.10 on a mole ratio basis. Since zirconium is excessive relative to barium, the B site of the titanate becomes excessive in the ceramic composition in the vicinity of the interface to the internal conductor film, sintering in the dielectric ceramic layer is accelerated, and the capacitance is thereby increased. The capacitance change rate with temperature becomes larger than that of Sample 8 containing no barium or zirconium.

What is claimed is:

1. A conductive paste comprising a conductive powder, a barium salt of an organic acid, an organic zirconium compound, and an organic vehicle, wherein the content of each of the organic acid barium salt in terms of barium atom and the organic zirconium compound in terms of zirconium atom is about 0.05 to 1.00 mol relative to one mol of the conductive powder, and the content of the organic zirconium compound in terms of zirconium atom is about 0.98 to 1.02 mol relative to one mol of the organic acid barium salt in terms of barium atom.

2. The conductive paste according to claim 1, wherein the conductive powder comprises a nickel powder.

3. The conductive paste according to claim 2, wherein the average particle diameter of the conductive powder is about 0.2 μm or less.

4. The conductive paste according to claim 1, wherein the average particle diameter of the conductive powder is about 0.2 μm or less.

5. A laminated ceramic electronic component comprising a plurality of laminated ceramic layers and at least one internal conductor film extending along an interface between two of the ceramic layers, wherein the internal conductor film is a fired conductive paste according to claim 1.

6. The laminated ceramic electronic component according to claim 5, wherein the ceramic layers comprise a barium titanate ceramic.

7. The laminated ceramic electronic component according to claim 6, having a pair of internal conductor films arranged to achieve a predetermined capacitance with at least one ceramic layer therebetween, and a pair of external electrodes electrically each of which is connected to a different internal conductor film and arranged on outer surfaces of the laminate, whereby a monolithic ceramic capacitor is formed.

8. The laminated ceramic electronic component according to claim 7, wherein the conductive powder comprises a nickel powder.

9. The laminated ceramic electronic component according to claim 8, wherein average particle diameter of the conductive powder is about 0.2 μm or less.

10. The laminated ceramic electronic component according to claim 5, having a pair of internal conductor films arranged to achieve a predetermined capacitance with at least one ceramic layer therebetween, and a pair of external electrodes electrically each of which is connected to a different internal conductor film and arranged on outer surfaces of the laminate, whereby a monolithic ceramic capacitor is formed.

11. The laminated ceramic electronic component according to claim 10, wherein the conductive powder comprises a nickel powder.

12. The laminated ceramic electronic component according to claim 11, wherein average particle diameter of the conductive powder is about 0.2 μm or less.

13. The laminated ceramic electronic component according to claim 5, wherein the conductive powder comprises a nickel powder.

14. The laminated ceramic electronic component according to claim 13, wherein average particle diameter of the conductive powder is about 0.2 μm or less.

15. The laminated ceramic electronic component according to claim 5, wherein average particle diameter of the conductive powder is about 0.2 μm or less.

* * * * *